US012037166B2

(12) United States Patent
Hwang

(10) Patent No.: US 12,037,166 B2
(45) Date of Patent: Jul. 16, 2024

(54) INTEGRATED COSMETIC DROPPER

(71) Applicant: F.S.KOREA INDUSTRIES INC., Seoul (KR)

(72) Inventor: Jae Kwang Hwang, Seoul (KR)

(73) Assignee: F.S.KOREA INDUSTRIES INC., Seoul (KR)

( * ) Notice: Subject to any disclaimer, the term of this patent is extended or adjusted under 35 U.S.C. 154(b) by 0 days.

(21) Appl. No.: 17/641,079

(22) PCT Filed: Oct. 14, 2019

(86) PCT No.: PCT/KR2019/013445

§ 371 (c)(1),
(2) Date: Mar. 7, 2022

(87) PCT Pub. No.: WO2021/075589

PCT Pub. Date: Apr. 22, 2021

(65) Prior Publication Data

US 2024/0043183 A1 Feb. 8, 2024

(51) Int. Cl.

| | |
|---|---|
| ***A46B 11/00*** | (2006.01) |
| ***A45D 34/04*** | (2006.01) |
| ***B01L 3/02*** | (2006.01) |
| ***B65D 1/02*** | (2006.01) |
| ***B65D 41/04*** | (2006.01) |
| ***B65D 47/18*** | (2006.01) |

(52) U.S. Cl.

CPC ............. *B65D 47/18* (2013.01); *A45D 34/04* (2013.01); *B01L 3/021* (2013.01); *B65D 1/0246* (2013.01); *B65D 41/04* (2013.01); *A45D 2200/10* (2013.01); *B01L 2300/047* (2013.01); *B01L 2300/123* (2013.01); *B01L 2400/0481* (2013.01)

(58) Field of Classification Search

CPC ...... A45D 34/04; A45D 34/045; B65D 47/18; B01L 3/0282

USPC ........................................................ 401/126

See application file for complete search history.

(56) References Cited

U.S. PATENT DOCUMENTS

| | | | | | |
|---|---|---|---|---|---|
| 4,416,400 | A * | 11/1983 | Dougherty, Sr. | B01L 3/0282 | 422/934 |
| 6,589,484 | B2 * | 7/2003 | Buehler | B01L 3/0282 | 73/864.11 |
| 9,351,556 | B2 * | 5/2016 | Kim | A45D 34/04 | |
| 11,040,342 | B2 * | 6/2021 | Ganter | B65D 47/18 | |
| 11,530,078 | B2 * | 12/2022 | Lee | B65D 47/18 | |
| 11,786,066 | B2 * | 10/2023 | Dong | A47J 27/21175 | 392/447 |
| 2022/0331791 | A1 * | 10/2022 | Bulla | B01L 3/0217 | |

FOREIGN PATENT DOCUMENTS

| | | | | |
|---|---|---|---|---|
| KR | 10-2012-0037830 A | | 4/2012 | |
| KR | 20-0484156 Y1 | | 8/2017 | |
| WO | WO-2015140423 A1 | * | 9/2015 | B01L 3/0272 |

* cited by examiner

*Primary Examiner* — Jennifer C Chiang

(74) *Attorney, Agent, or Firm* — Heedong Chae; Lucem, PC

(57) ABSTRACT

Disclosed is an integral cosmetic dropper. The integral cosmetic dropper includes a container body in which cosmetic contents are stored; a cap part including a cap body coupled to the container body and a pumping body provided in the cap body; and a pipette part which is coupled to one side of the cap part to suction or eject the cosmetic contents, wherein the pumping body and the cap body are integrally provided.

3 Claims, 5 Drawing Sheets

INTEGRATED COSMETIC DROPPER

BACKGROUND OF THE INVENTION

Field of the Invention

The present disclosure relates to a dropper, and more particularly, to an integral cosmetic dropper capable of increasing operation efficiency by simplifying a process operation of a cap part.

Description of the Related Art

In general, as a method of using liquid cosmetic contents such as cosmetics, which preferably use a small amount of eye cream and the like at a time, but use a precise quantity, in the related art, a method of individually packaging the contents in the form of a capsule or the like by an amount to be used every use time was used.

However, such an individual packaging method is inefficient because a relatively large amount remains inside a capsule even after a user uses the contents.

In order to overcome the problems of such an individual packaging method, after the contents are accommodated in a container, there is disclosed a configuration to be used by extracting the contents whenever use by using an extracting means having a general pipette or a syringe structure or using an extracting means having a configuration of a push pump.

Among them, in the case of the extracting means having the configuration of the push pump, there is an advantage that a certain amount of contents may be extracted whenever simply pressing a button.

On the other hand, a process of manufacturing a conventional dropper is as follows. First, an inner cap and a metal outer cover made of aluminum are assembled with each other by a bond. Next, a pipette, which is a passage for suctioning or ejecting cosmetic contents, and a rubber bulb for providing pressure for suctioning or ejecting the cosmetic contents are assembled with each other. Finally, the production is completed by assembling the inner cap coupled with the metal outer cover and the rubber bulb coupled with the pipette.

In the case of such production, it takes time to assemble each product, and the product is damaged during the assembly operation to lower the operation efficiency, and as a result, the improvement measures are required.

The above-described technical configuration is the background art for helping in the understanding of the present disclosure, and does not mean a conventional technology widely known in the art to which the present disclosure pertains.

SUMMARY OF THE INVENTION

The present disclosure has been made in an effort to provide an integral cosmetic dropper capable of increasing the operation efficiency by simplifying a process operation of a cap part.

According to an aspect of the present disclosure, there is provided an integral cosmetic dropper including a container body in which cosmetic contents are stored; a cap part including a cap body coupled to the container body and a pumping body provided in the cap body; and a pipette part which is coupled to one side of the cap part to suction or eject the cosmetic contents, wherein the pumping body and the cap body are integrally provided.

The pumping body and the cap body may be provided by injection molding.

The pipette part may include a pipette body configured to suction or eject the cosmetic contents stored in the container body; and an expansion body provided at one end the pipette body and coupled to the coupling body, wherein the expansion body may be fitted to the coupling body.

The pipette part may further include an extension body provided to protrude from an outer wall of the expansion body in a direction of the cap body, wherein the extension body may be fitted to the coupling groove provided in the cap body.

The pumping body and the cap body may be provided by double injection molding.

According to the embodiments of the present disclosure, it is possible to increase the operation efficiency by integrally providing the pumping body and the cap body to reduce time required for assembling the pumping body and the cap body with each other.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
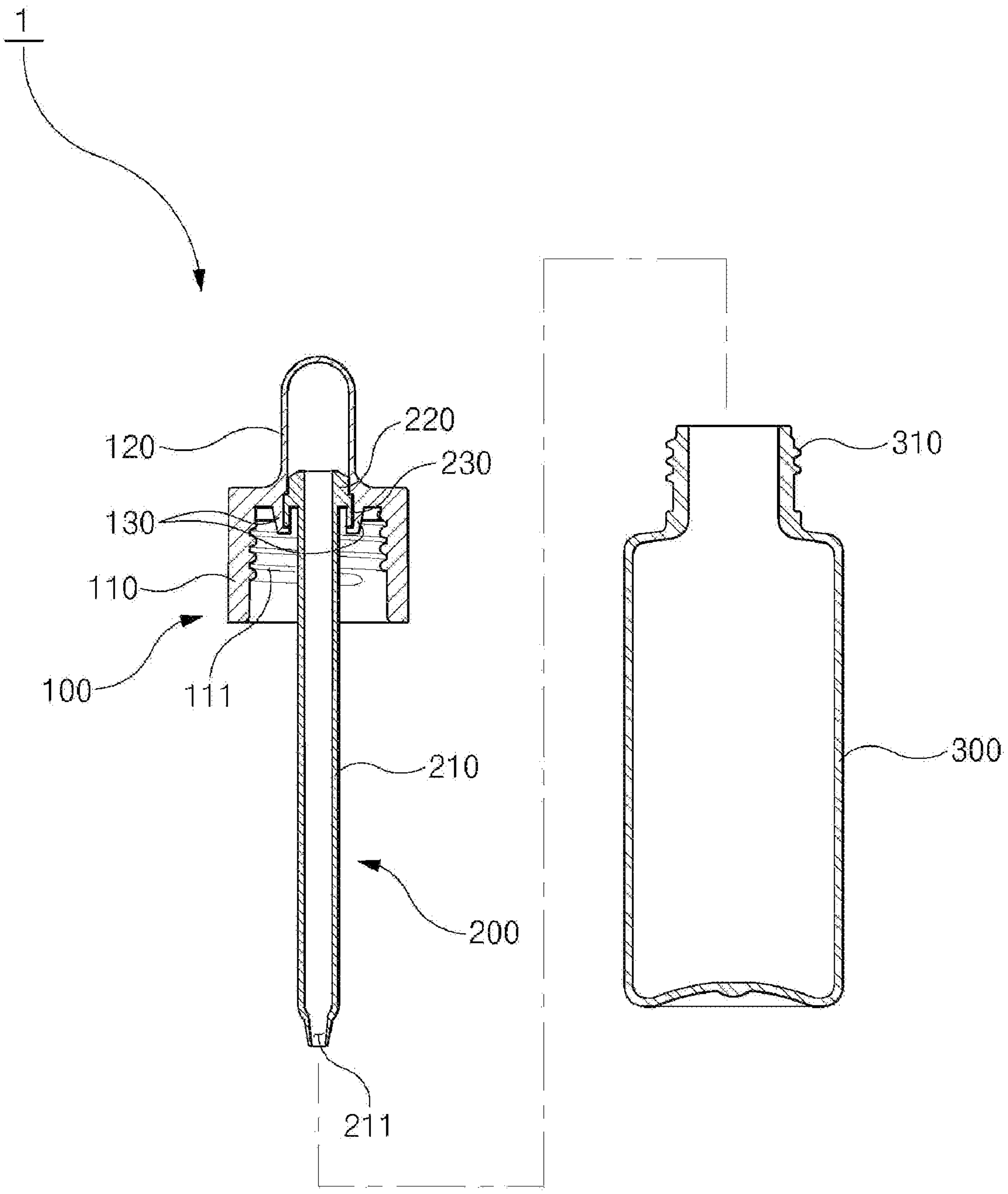
FIG. 1 is a diagram schematically illustrating an integral cosmetic dropper according to an embodiment of the present disclosure.

In order to fully understand the present disclosure, operational advantages of the present disclosure and objects to be achieved by implementing the present disclosure, the present disclosure will be described with reference to the accompanying drawings which illustrate preferred embodiments of the present disclosure and the contents illustrated in the accompanying drawings.

Hereinafter, preferred embodiments of the present disclosure will be described in detail with reference to the accompanying drawings. Like reference numerals illustrated in the respective drawings designate like members.

Figure 2:
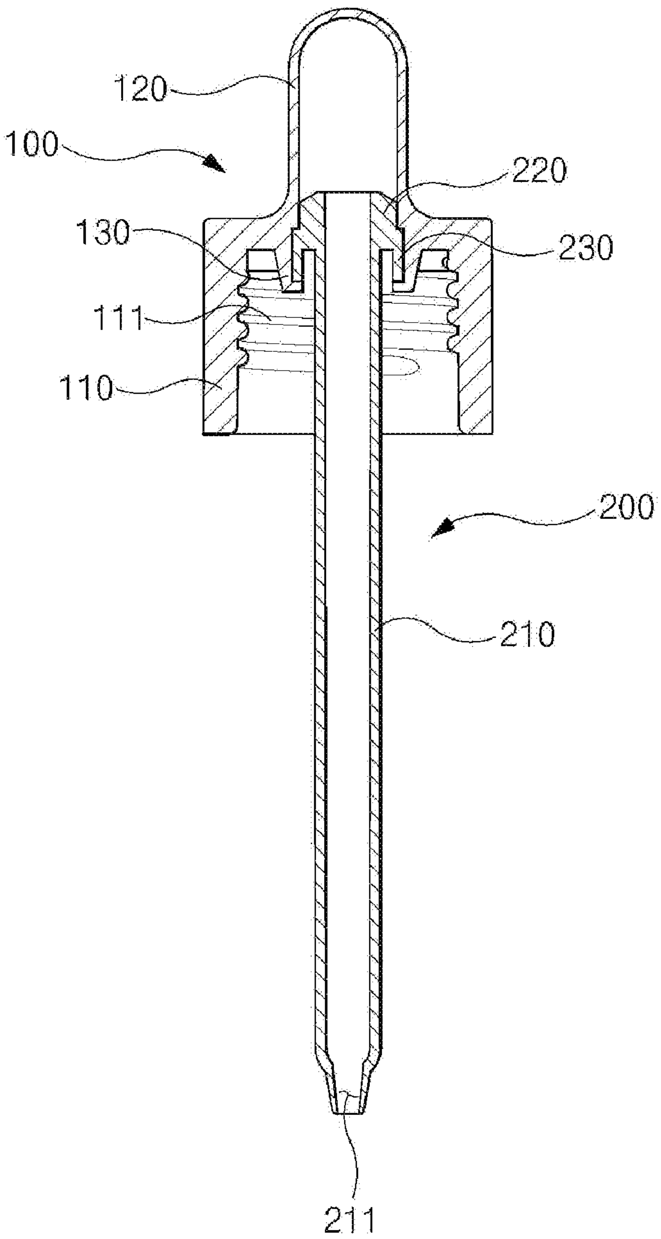
FIG. 2 is a diagram illustrating a cap part and a pipette part illustrated in FIG. 1.
Figure 3:
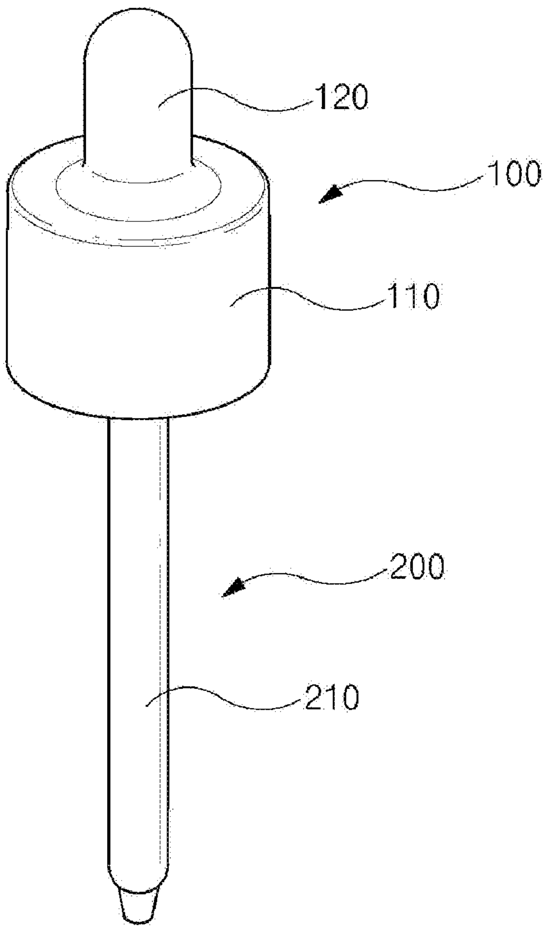
FIG. 3 is a schematically perspective view of FIG. 2.
Figure 4:
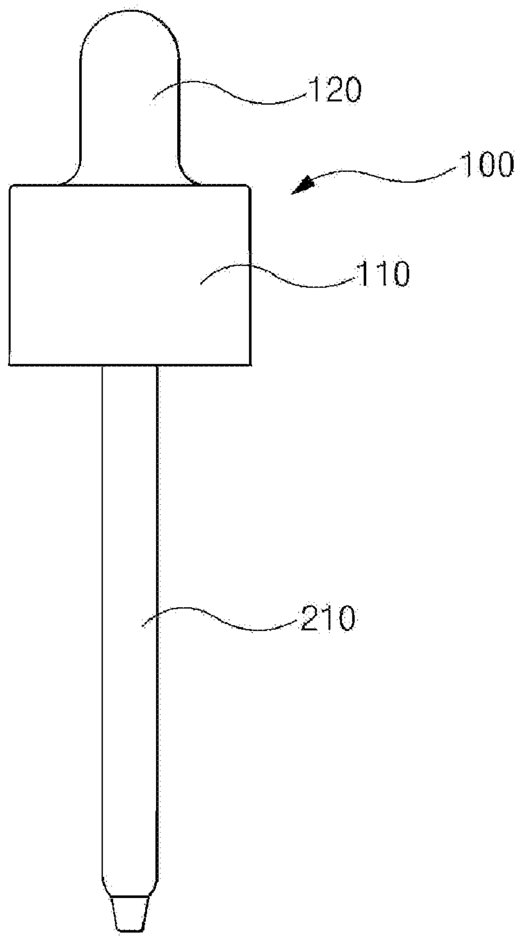
FIG. 4 is a front view of FIG. 3.
Figure 5:
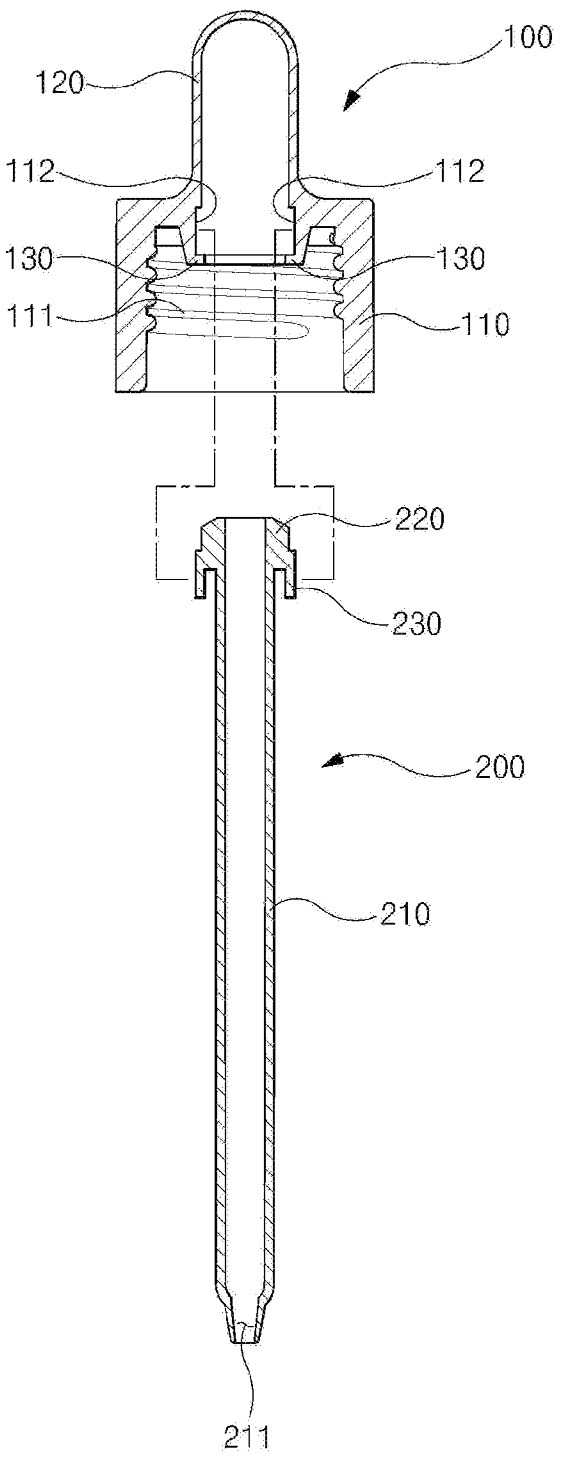
FIG. 5 is a diagram schematically illustrating the separation of the pipette part from the cap part illustrated in FIG. 2.

FIG. 1 is a diagram schematically illustrating an integral cosmetic dropper according to an embodiment of the present disclosure, FIG. 2 is a diagram illustrating a cap part and a pipette part illustrated in FIG. 1, FIG. 3 is a schematically perspective view of FIG. 2, FIG. 4 is a front view of FIG. 3, and FIG. 5 is a diagram schematically illustrating the separation of the pipette part from the cap part illustrated in FIG. 2.

As illustrated in these drawings, an integral cosmetic dropper 1 according to the embodiment includes a cap part 100, a pipette part 200 coupled to one side of the cap part 100 to suction or eject cosmetic contents, and a container body 300 which is detachably coupled with the cap part 100 to store the cosmetic contents.

As illustrated in FIG. 1, the cap part 100 is detachably coupled to the container body 300, and a pipette part 200 may be coupled therein.

In the embodiment, as illustrated in FIG. 1, the cap part 100 includes a cap body 110 coupled to the container body 300, a pumping body 120 provided integrally with the cap body 110, and a coupling body 130 provided inside the cap body 110 to support an extension body 230 of the pipette part 200.

The cap body 110 and the pumping body 120 of the cap part 100 may be provided integrally. For example, the cap body 110 and the pumping body 120 may be provided by injection molding, for example, double injection molding.

In addition, in the embodiment, the pumping body 120 may be made of a material including a rubber material, and the cap body 110 may be made of a plastic or rubber material, or a metal material including aluminum.

In addition, in the embodiment, on an inner wall of the cap body 110, as illustrated in FIG. 1, a cap screw thread 111 is provided, and the cap screw thread 111 may be screwed with a body screw thread 310 provided above the container body 300.

In addition, in the embodiment, inside the cap body 110, as illustrated in FIG. 5, a coupling groove 112 is provided, and the coupling groove 112 is provided to extend to the coupling body 130 and may be provided as a place for fitting the extension body 230 of the pipette unit 200 as illustrated in FIG. 2.

The pumping body 120 of the cap part 100 may be provided integrally with the cap body 110, may be provided in a dome shape having a space formed therein and elasticity, and may be formed of a rubber material.

As illustrated in FIG. 5, the coupling body 130 of the cap part 100 is provided to extend downward from an inner ceiling portion of the cap body 110 to be provided as a coupling place of the extension body 230 of the pipette part 200. In the embodiment, the coupling body 130 may have an 'L' shape.

The pipette part 200 may suction or eject liquid cosmetic contents stored in the container body 300 by the pressing force of the pumping body 120.

In the embodiment, as illustrated in FIG. 5, the pipette part 200 includes a pipette body 210 provided with a pipette hole 211 for suctioning or ejecting the cosmetic contents stored in the container body 300, an expansion body 220 provided at the upper end of the pipette body 210 and coupled to the coupling body 130, and an extension body 230 provided to protrude from an outer wall of the expansion body 220 in a direction of the cap body 110.

In the embodiment, the expansion body 220 may be fitted to the coupling body 130.

In addition, in the embodiment, the extension body 230 may be fitted to the coupling groove 112 provided in the cap body 110 and the extension body 230.

The container body 300 stores the liquid cosmetic contents therein, and a body screw thread 310 is provided on the upper portion thereof to be detachably screwed with the cap screw thread 111 of the cap part 100.

Hereinafter, a manufacturing process of the embodiment will be described briefly.

In the pumping body 120, the cap part 100 and the pipette part 200 integrally coupled to each other are prepared and then fitted to each other. In some cases, an adhesive including a natural adhesive may be applied to the expansion body 220 and the extension body 230. Thereafter, the cap part 100 to which the pipette part 200 is coupled may be screwed to the container body 300 to complete the operation.

As described above, according to the embodiment, it is possible to increase the operation efficiency by integrally providing the pumping body and the cap body to reduce time required for assembling the pumping body and the cap body with each other.

As described above, the present disclosure is not limited to the embodiments described herein, and it will be apparent to those skilled in the art that various changes and modifications may be made without departing from the spirit and the scope of the present disclosure. Therefore, it will be understood that these changes and modifications are included in the appended claims of the present disclosure.

What is claimed is:

1. An integral cosmetic dropper comprising:
- a container body in which cosmetic contents are stored;
- a cap part including a cap body coupled to the container body and a pumping body provided in the cap body; and
- a pipette part which is coupled to one side of the cap part to suction or eject the cosmetic contents,
- wherein the pumping body and the cap body are integrally provided,
- wherein the cap part further comprises a coupling body and a "]"-shaped coupling groove such that the coupling body downwardly extends inside the cap body to form the "]"-shaped coupling groove and form a space between the coupling body and the cap body,
- wherein the pipette part comprises:
  - a pipette body configured to suction or eject the cosmetic contents stored in the container body;
  - an expansion body provided at one end of the pipette body and removably coupled to an inside of the pumping body; and
  - an extension body outwardly extending from the expansion body and removably coupled to the coupling body and received in the "]"-shaped coupling groove.

2. The integral cosmetic dropper of claim 1, wherein the pumping body and the cap body are provided by injection molding.

3. The integral cosmetic dropper of claim 1, wherein the pumping body and the cap body are provided by double injection molding.

* * * * *